United States Patent [19]
Pompei

[11] Patent Number: 5,183,337
[45] Date of Patent: Feb. 2, 1993

[54] THERMOMETER CALIBRATION

[75] Inventor: Francesco Pompei, Boston, Mass.

[73] Assignee: Exergen Corporation, Newton, Mass.

[21] Appl. No.: 726,817

[22] Filed: Jul. 8, 1991

[51] Int. Cl.[5] .............................................. G01K 15/00
[52] U.S. Cl. .............................................. 374/2; 374/3
[58] Field of Search ........................................ 374/2, 3

[56] References Cited

U.S. PATENT DOCUMENTS

| | | | |
|---|---|---|---|
| 3,287,956 | 11/1966 | Dreyfus et al. | 374/2 |
| 3,348,408 | 10/1967 | Engborg | 374/2 |
| 3,631,708 | 1/1972 | Ensor | 374/2 |

FOREIGN PATENT DOCUMENTS 0137011 8/1979 Fed. Rep. of Germany .......... 374/2
0029725 2/1986 Japan ....................................... 374/2

OTHER PUBLICATIONS

Scholl, M., "Temperature calibration of an infrared radiation source," Applied Optics, vol. 19, No. 21 (Nov. 1, 1980).

Primary Examiner—William A. Cuchlinski, Jr.
Assistant Examiner—Diego F. F. Gutierrez
Attorney, Agent, or Firm—Fish & Richardson

[57] ABSTRACT

A black body for calibrating an infrared thermometer includes a cavity and is configured to float stably on a surface of a volume of liquid with the cavity in close thermal contact with the liquid and the opening exposed above the surface.

8 Claims, 1 Drawing Sheet

THERMOMETER CALIBRATION

BACKGROUND OF THE INVENTION

This invention relates to thermometer calibration.

In hospitals, for example, a fever thermometer is typically checked for calibration by immersing it in a water bath and comparing the resulting thermometer reading with the known temperature of the bath. A thermometer of the kind that detects temperature by sensing infrared radiation is typically calibrated by aiming the sensor at a black body of a known temperature.

SUMMARY OF THE INVENTION

In general, in one aspect, the invention features a black body for calibrating an infrared thermometer. The black body includes a cavity and is configured to float stably on a surface of a volume of liquid with the cavity in close thermal contact with the liquid and the opening exposed above the surface.

In general, in another aspect, the invention features a black body in which a metal piece encloses a cavity; a support, of lower mass density than the metal piece, is connected to the metal piece and provides an opening into the cavity.

In preferred embodiments of the invention, the metal piece is an aluminum tube and the support is a plastic cup.

In general, in another aspect, the invention features a method of calibrating an infrared thermometer comprising immersing a black body cavity in a volume of liquid at a known temperature with an opening to the cavity exposed at a surface of the liquid, and using the thermometer to measure the temperature inside the black body via the exposed opening.

The calibration black body is easy and inexpensive to make, provides accurate, rapid calibration readings, and can be used in a conventional warm-water bath.

Other advantages and features will become apparent from the following description and from the claims.

DETAILED DESCRIPTION OF THE DRAWINGS

Figure 1:
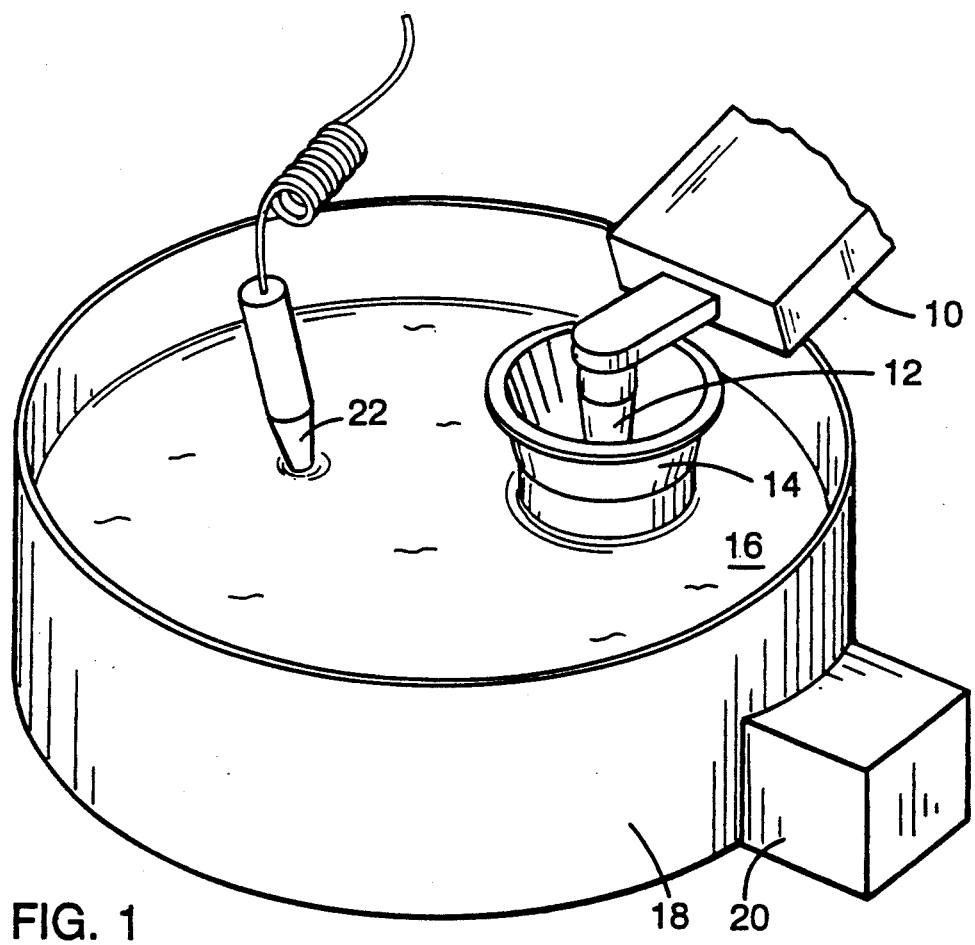
FIG. 1 is a perspective view of a calibration black body in a water bath.

Referring to FIG. 1, an infrared tympanic thermometer 10 (for example, the kind available as Model Ototemp 3000 from Exergen Corporation of Newton, Ma, USA) may be calibrated by inserting the probe end 12 into a calibration black body 14 floating in a warm-water bath 16. Water bath 16 is contained in a tub 18. The black body is steadied by hand while the probe end is being inserted. The temperature of water bath 16 is kept constant, by appropriate equipment 20, at a temperature within the range of the thermometer to be calibrated (e.g., 65 to 110 degrees F.). Equipment 20 includes a carefully calibrated thermometer for detecting and displaying the true temperature of the water bath. Once the probe end of the thermometer 10 has been inserted into the black body, the user causes the thermometer to take a reading which can then be compared with the true temperature displayed on equipment 20. A conventional contact-type electronic thermometer may be calibrated by immersing its temperature sensitive tip 22 in the same water bath.

Figure 2:
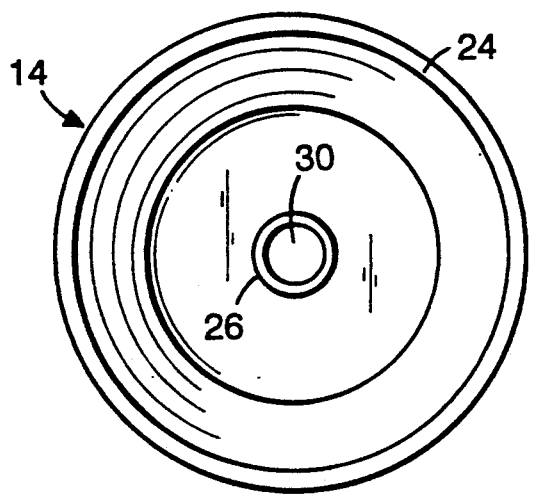
FIGS. 2 and 3 are a top view and a side view, partially broken away, of the calibration black body.
Figure 3:
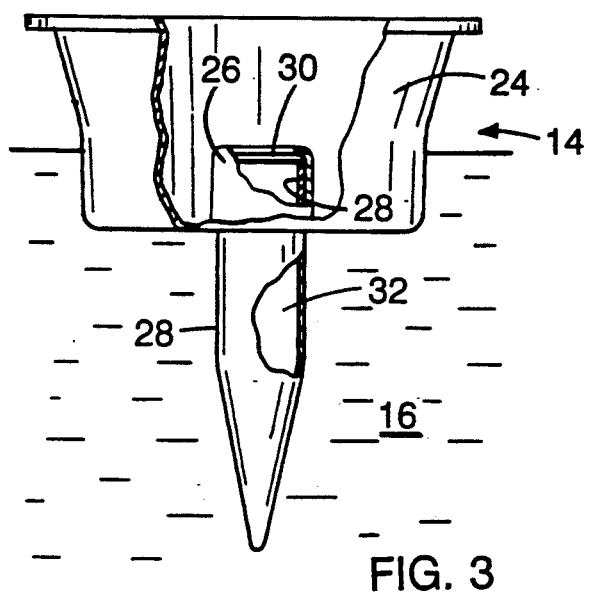

Referring to FIGS. 2 and 3, calibration black body 14 includes a molded plastic cup 24 which incorporates a receptacle 26 into which the cut-off tip (length 2¾") of a ⅜" diameter aluminum knitting needle 28 has been force fit or simply glued. A round hole 30 at the top of receptacle 26 is of a diameter (e.g., ⅜") appropriate to receive the probe end of the thermometer.

The inner surface 32 of the knitting needle is painted flat black so that the inner cavity of the needle serves as a black body cavity. The relatively high thermal conductivity of the aluminum knitting needle assures that the temperature of the internal cavity quickly (e.g., within 15 seconds) reaches and tracks the temperature of the water bath.

The shape and relatively lower density of the plastic cup and the relatively higher density of the aluminum knitting needle serve to cause the calibration black body to float in the water bath in a stable position with the hole 30 oriented vertically upward to receive the probe end. The shape and size of the cup also shield the hole 30 from water droplets that might otherwise splash into the cavity of the knitting needle.

Other embodiments are within the scope of the following claims. For example, the calibration black body need not be of two piece construction, and other metal pieces could be substituted for the inexpensive knitting needle. A nonmetallic piece could also be used in place of the metallic piece if thin enough to maintain the temperature gradient across the material to less than approximately 0.1 degree F. The thermometer could be other than a tympanic type.

I claim:

1. A black body for calibrating an infrared thermometer, comprising:
   a cavity, and
   a support connected to the cavity and providing an opening into the cavity,
   wherein said support and said cavity are structured to define means for causing the black body to float freely and stably on a surface of a volume of liquid with the cavity in close thermal contact with the liquid and the opening accessible from above the surface.

2. The black body of claim 1, further comprising a metal piece connected to said support and enclosing said cavity, an outer surface of said metal piece being exposed to the space outside the cavity.

3. The black body of claim 1 further comprising a body piece enclosing said cavity, and wherein said a support is of lower mass density than the body piece, and is connected to the body piece.

4. The black body of claim 3 wherein said body piece comprises an aluminum tube.

5. The black body of claim 3 wherein said body piece comprises a nonmetallic material.

6. The black body of claim 2 or 3 wherein said support comprises a plastic cup.

7. The black body of claim 1 wherein said support comprises
   a plastic cup, and
   said black body further comprises a metal tube attached to the plastic cup,
   the metal tube enclosing the cavity, the cavity being generally closed and having an opening exposed to the space inside the plastic cup.

8. A method of calibrating an infrared thermometer comprising
   floating a black body cavity freely on a surface of a volume of liquid at a known temperature with an opening to the cavity accessible from above the sufrace of the liquid, and using the thermometer to measure the temperature inside the black body cavity via the opening, said temperature being used to calibrate said thermometer.

* * * * *